United States Patent
Homma et al.

(10) Patent No.: US 8,648,816 B2
(45) Date of Patent: Feb. 11, 2014

(54) INFORMATION PROCESSING APPARATUS, THRESHOLD VALUE SETTING METHOD, AND THRESHOLD VALUE SETTING PROGRAM

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 1016 days.

(21) Appl. No.: 12/716,124

(22) Filed: Mar. 2, 2010

(65) Prior Publication Data
US 2010/0225604 A1 Sep. 9, 2010

(30) Foreign Application Priority Data
Mar. 9, 2009 (JP) .............................. P2009-055405

(51) Int. Cl.
*G06F 3/041* (2006.01)
(52) U.S. Cl.
USPC ........... 345/173; 345/104; 345/174; 345/156; 340/5.83; 340/5.53; 178/18.05; 178/18.06; 382/124; 382/155
(58) Field of Classification Search
USPC .......................... 345/173, 87, 156, 104, 174; 340/708–710, 721, 723, 5.83, 5.53; 178/18.1–19, 18.05–18.06; 382/124, 382/115, 299
See application file for complete search history.

(56) References Cited

U.S. PATENT DOCUMENTS

| | | | | |
|---|---|---|---|---|
| 2003/0072475 | A1* | 4/2003 | Tamori | 382/124 |
| 2005/0259850 | A1* | 11/2005 | Shimamura et al. | 382/124 |
| 2006/0284858 | A1* | 12/2006 | Rekimoto | 345/173 |

FOREIGN PATENT DOCUMENTS

JP 2006-345209 12/2006

\* cited by examiner

*Primary Examiner* — Lun-Yi Lao
*Assistant Examiner* — Shaheda Abdin
(74) *Attorney, Agent, or Firm* — Sherr & Jiang, PLLC

(57) ABSTRACT

An information processing apparatus includes: a recognition section which recognizes the shape of an object being in contact with an operation screen of an operating section; a pressure detecting section which detects the pressure of the object on the operation screen; a threshold value setting section which sets a threshold value of the pressure, which is a value for determining a pressure operation on the operation screen, on the basis of the shape of the object recognized by the recognition section; and a determination section which determines whether or not a pressure operation has been performed on the operation screen on the basis of the pressure detected by the pressure detecting section and the threshold value set by the threshold value setting section.

15 Claims, 11 Drawing Sheets

PATTERN EXAMPLES OF THRESHOLD VALUES A1 TO A3

| PATTERN | THICKNESS OF FINGER (pix) | DETECTION OF FINGERTIP | DETECTION OF THUMB | THRESHOLD VALUE A1 | THRESHOLD VALUE A2 | THRESHOLD VALUE A3 |
|---|---|---|---|---|---|---|
| 1 | <64 (THIN) | O | O | 40+5 | 60+5 | 70+5 |
| 2 | 64-96 (NORMAL) | O | O | 50+5 | 70+5 | 80+5 |
| 3 | >96 (THICK) | O | O | 60+5 | 80+5 | 90+5 |
| 4 | <64 (THIN) | × | O | 40+10 | 60+10 | 70+10 |
| 5 | 64-96 (NORMAL) | × | O | 50+10 | 70+10 | 80+10 |
| 6 | >96 (THICK) | × | O | 60+10 | 80+10 | 90+10 |
| 7 | <64 (THIN) | O | × | 40-10 | 60-10 | 70-10 |
| 8 | 64-96 (NORMAL) | O | × | 50-10 | 70-10 | 80-10 |
| 9 | >96 (THICK) | O | × | 60-10 | 80-10 | 90-10 |
| 10 | <64 (THIN) | × | × | 40-5 | 60-5 | 70-5 |
| 11 | 64-96 (NORMAL) | × | × | 50-5 | 70-5 | 80-5 |
| 12 | >96 (THICK) | × | × | 60-5 | 80-5 | 90-5 |

CONFIGURATION OF OUTER APPEARANCE OF IMAGE DISPLAY DEVICE

CONFIGURATION OF DISPLAY SECTION

HARDWARE CONFIGURATION OF IMAGE DISPLAY DEVICE

CAPACITANCE CHANGE ON OPERATION SCREEN OF ELECTROSTATIC TOUCH PANEL

DISCRIMINATION BETWEEN CONTACT PORTION AND APPROACH PORTION

STATE WHERE FINGER IS IN CONTACT WITH OPERATION SCREEN

- CONTACT PORTION (EQUAL TO OR LARGER THAN THRESHOLD VALUE T1)
- APPROACH PORTION (EQUAL TO OR LARGER THAN THRESHOLD VALUE T2 AND EQUAL TO OR SMALLER THAN T1)

T1>T2

STATE WHERE FINGER APPROACHES

CONFIGURATION OF IMAGE VIEWING SCREEN

RELATIONSHIP BETWEEN PRESSING FORCE AND SCROLL SPEED

APPROACH IMAGE WHEN TOUCH IS PERFORMED IN STATE WHERE FINGER IS LAID DOWN

APPROACH IMAGE WHEN TOUCH IS PERFORMED IN STATE WHERE FINGER IS ERECT

DETERMINATION ON WHETHER OR NOT TOUCH FINGER IS THUMB

FIG.10A  FIG.10B
APPROACH IMAGE + CONTACT IMAGE   APPROACH IMAGE + CONTACT IMAGE

● CONTACT PORTION
◉ APPROACH PORTION

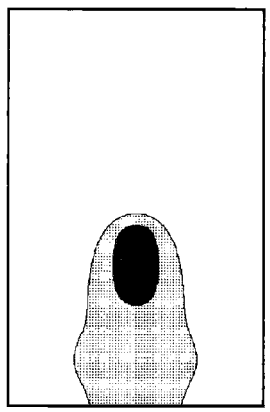
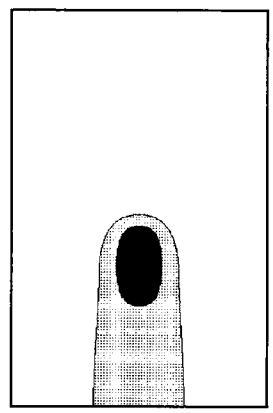

SHAPE OF THUMB   SHAPE OF FINGER OTHER THAN THUMB

DETERMINATION ON WHETHER OR NOT TOUCH IS PERFORMED BY FINGERTIP

FIG.11A  FIG.11B
APPROACH IMAGE + CONTACT IMAGE   APPROACH IMAGE + CONTACT IMAGE

● CONTACT PORTION
◉ APPROACH PORTION

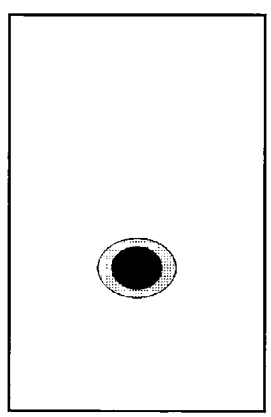
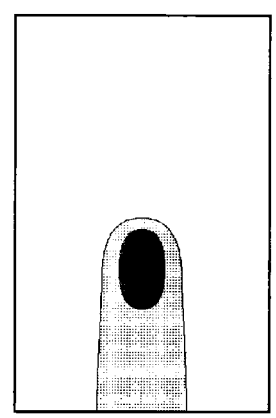

SHAPE OF FINGERTIP   SHAPE OF CUSHION SIDE OF FINGER

FIG.12
PATTERN EXAMPLES OF THRESHOLD VALUES A1 TO A3

| PATTERN | THICKNESS OF FINGER (pix) | DETECTION OF FINGERTIP | DETECTION OF THUMB | THRESHOLD VALUE A1 | THRESHOLD VALUE A2 | THRESHOLD VALUE A3 |
|---|---|---|---|---|---|---|
| 1 | <64 (THIN) | ○ | ○ | 40+5 | 60+5 | 70+5 |
| 2 | 64-96 (NORMAL) | ○ | ○ | 50+5 | 70+5 | 80+5 |
| 3 | >96 (THICK) | ○ | ○ | 60+5 | 80+5 | 90+5 |
| 4 | <64 (THIN) | × | ○ | 40+10 | 60+10 | 70+10 |
| 5 | 64-96 (NORMAL) | × | ○ | 50+10 | 70+10 | 80+10 |
| 6 | >96 (THICK) | × | ○ | 60+10 | 80+10 | 90+10 |
| 7 | <64 (THIN) | ○ | × | 40-10 | 60-10 | 70-10 |
| 8 | 64-96 (NORMAL) | ○ | × | 50-10 | 70-10 | 80-10 |
| 9 | >96 (THICK) | ○ | × | 60-10 | 80-10 | 90-10 |
| 10 | <64 (THIN) | × | × | 40-5 | 60-5 | 70-5 |
| 11 | 64-96 (NORMAL) | × | × | 50-5 | 70-5 | 80-5 |
| 12 | >96 (THICK) | × | × | 60-5 | 80-5 | 90-5 |

PRESSURE CHANGE IN CASE OF HAVING OVERSHOOT CHARACTERISTIC

THRESHOLD VALUE SETTING PROCEDURE

FUNCTIONAL CONFIGURATION OF IMAGE DISPLAY DEVICE

DETERMINATION ON WHETHER OR NOT TOUCH FINGER IS WOMAN'S FINGER IN ANOTHER EMBODIMENT

APPROACH IMAGE + CONTACT IMAGE

NO ARTIFICIAL NAIL

APPROACH IMAGE + CONTACT IMAGE

ARTIFICIAL NAIL

● CONTACT PORTION

◯ APPROACH PORTION

FIG.17

PATTERN EXAMPLES OF THRESHOLD VALUES A1 TO A3

| PATTERN | THICKNESS OF FINGER (pix) | THRESHOLD VALUE A1 | THRESHOLD VALUE A2 | THRESHOLD VALUE A3 |
|---|---|---|---|---|
| 1 | <64(THIN) | 40 | 60 | 70 |
| 2 | 64-96(NORMAL) | 50 | 70 | 80 |
| 3 | >96(THICK) | 60 | 80 | 90 |

INFORMATION PROCESSING APPARATUS, THRESHOLD VALUE SETTING METHOD, AND THRESHOLD VALUE SETTING PROGRAM

BACKGROUND OF THE INVENTION

1. Field of the Invention

The present invention relates to an information processing apparatus, a threshold value setting method, and a threshold value setting program, and is suitable for being applied to an information processing apparatus in which an operation input can be performed by pressure of a finger or the like.

2. Description of the Related Art

In recent years, information processing apparatuses which have capacitance type touch panels (also called electrostatic touch panels) have come into wide use. In this kind of information processing apparatus, a more intuitive operation is realized by gesture operations, such as touch, drag, and flick, on an operation screen of the electrostatic touch panel. In addition, the flick is an operation of hitting the operation screen lightly with a finger or the like.

In addition, an information processing apparatus has been proposed in which a pressure sensor is disposed behind an electrostatic touch panel (for example, JP-A-2006-345209). In this kind of information processing apparatus, pressure (also called a pressing force) with which a finger or the like presses an operation screen is detected by a pressure sensor and, for example, the magnification rate of an image is changed according to the size of the pressing force.

Since the movement of a finger does not occur in such a pressure operation, an easy operation may be performed even on a small touch screen with a size of about several inches. In addition, since it is sufficient to simply detect the pressure, there is an advantage in that an influence from the outside, such as electrostatic noise, is not easily received.

SUMMARY OF THE INVENTION

On the other hand, the pressure (that is, a pressing force) with which the operation screen is pressed changes with a difference in gripping power between a man and a woman or a difference between pressing fingers of thumb and index finger, for example. That is, even if a user intentionally presses the operation screen, the pressing force at that time changes with the gripping power, a pressing finger, and the like.

Accordingly, in a known information processing apparatus which can be operated by pressure, it was difficult to set the threshold value of the pressing force for determining a user's pressure operation. For this reason, depending on the set threshold value, there has been a problem that a user's intended pressing is not recognized or recognition as a pressure operation is performed regardless of a user's intention.

Thus, it is desirable to provide an information processing apparatus, a threshold value setting method, and a threshold value setting program capable of recognizing a user's pressure operation more reliably than in the related art.

According to an embodiment of the present invention, there are provided: a recognition section which recognizes the shape of an object being in contact with an operation screen of an operating section; a pressure detecting section which detects the pressure of the object on the operation screen; a threshold value setting section which sets a threshold value of the pressure, which is a value for determining a pressure operation on the operation screen, on the basis of the shape of the object recognized by the recognition section; and a determination section which determines whether or not a pressure operation has been performed on the operation screen on the basis of the pressure detected by the pressure detecting section and the threshold value set by the threshold value setting section.

In this case, the threshold value can be set lower as the pressure of the object, which can be estimated from the shape of the object being in contact with the operation screen, becomes smaller, for example. As a result, it is possible to set a threshold value suitable for the pressing force of a user who actually performs a pressure operation.

According to the embodiment of the present invention, it is possible to set a threshold value suitable for the pressing force when a pressure operation is actually performed. As a result, it is possible to realize an information processing apparatus, a threshold value setting method, and a threshold value setting program capable of recognizing a user's pressure operation more reliably than in the related art.

BRIEF DESCRIPTION OF THE DRAWINGS

FIGS. 10A and 10B are schematic diagrams presented to explain the determination on whether or not a touch finger is a thumb;

FIGS. 11A and 11B are schematic diagrams presented to explain the determination on whether or not a touch using a fingertip is performed;

FIG. 12 is a table showing pattern examples of threshold values;

FIG. 17 is a table illustrating pattern examples of threshold values in another embodiment.

DESCRIPTION OF THE PREFERRED EMBODIMENTS

Hereinafter, best modes for carrying out the present invention (hereinafter, referred to as embodiments) will be described. In addition, the explanation will be performed in the following order.

1. First embodiment
2. Other embodiments

<1. First Embodiment>

[1-1. Configuration of Outer Appearance of an Image Display Device]

Figure 1:
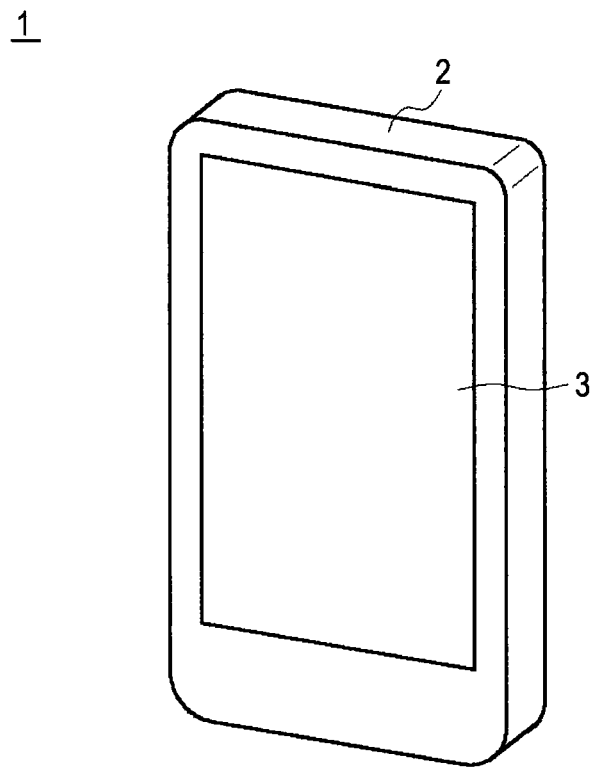
FIG. 1 is a schematic diagram illustrating the configuration of the outer appearance of an image display device.

In FIG. 1, reference numeral 1 indicates the configuration of a portable image display device as an information processing apparatus according to the present embodiment. The image display device 1 has a housing 2 which has a size that can be gripped with a single hand and which has an approximately flat rectangular shape. A rectangular display section 3 is provided on a front surface of the housing 2.

Figure 2:
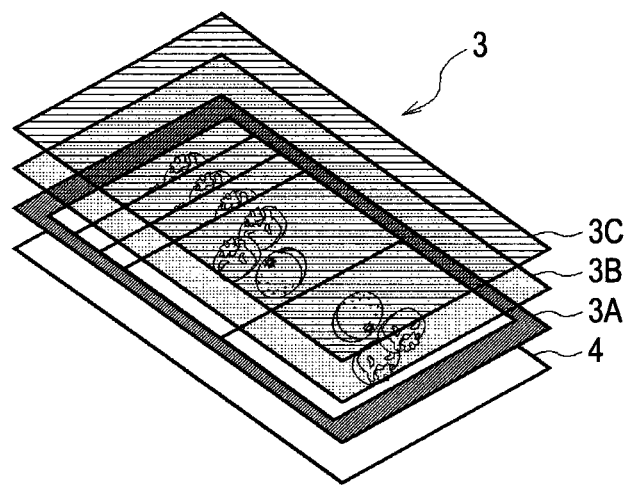
FIG. 2 is a schematic diagram illustrating the configuration of a display section.

As shown in FIG. 2, the display section 3 includes a liquid crystal display 3A, which is provided on a thin plate, and a pressure sensor 3B and an electrostatic touch panel 3C each of which has a size enough to cover a display surface of the liquid crystal display 3A and has a transparent thin plate shape.

The liquid crystal display 3A is provided on a substrate 4 within the housing 2. The pressure sensor 3B is provided on the liquid crystal display 3A so as to cover the display surface. In addition, the electrostatic touch panel 3C is provided on the pressure sensor 3B so as to cover the pressure sensor 313. The surface of the electrostatic touch panel 3C is an operation screen of the image display device 1. In addition, since the electrostatic touch panel 3C and the pressure sensor 3B in the image display device 1 have transparent thin plate shapes as described above, the user can touch the operation screen with a feeling of directly touching the display surface of the liquid crystal display 3A.

Here, the pressure sensor 3B is a sensor that detects the pressure (pressing force) with which a user's finger or the like presses the operation screen and is also called a pressure-sensitive sensor, a pressure detection device, or the like. In addition, the electrostatic touch panel 3C is a capacitance type touch panel which detects a touch or approach of a finger or the like to the operation screen.

The image display device 1 stores the image data in an internal nonvolatile memory and displays images based on the image data on the liquid crystal display 3A of the display section 3 so that the user views the images. In addition, the image display device 1 receives the input of a gesture operation, such as touch, drag, or flick, on the operation screen by detecting a touch of a user's finger or the like on the surface (that is, the operation screen) of the electrostatic touch panel 3C by means of the electrostatic touch panel 3C.

In addition, the image display device 1 receives the input of a pressure operation on the operation screen by detecting the pressure (pressing force), with which the user's finger or the like has pressed the operation screen, by means of the pressure sensor 3B provided behind the electrostatic touch panel 3C.

In addition, the image display device 1 displays an image and performs various kinds of control, such as switching, enlargement, and reduction of a display image, in response to the gesture operation and the pressure operation (these are also collectively called a user operation).

[1-2. Hardware Configuration of an Image Display Device]

Figure 3:
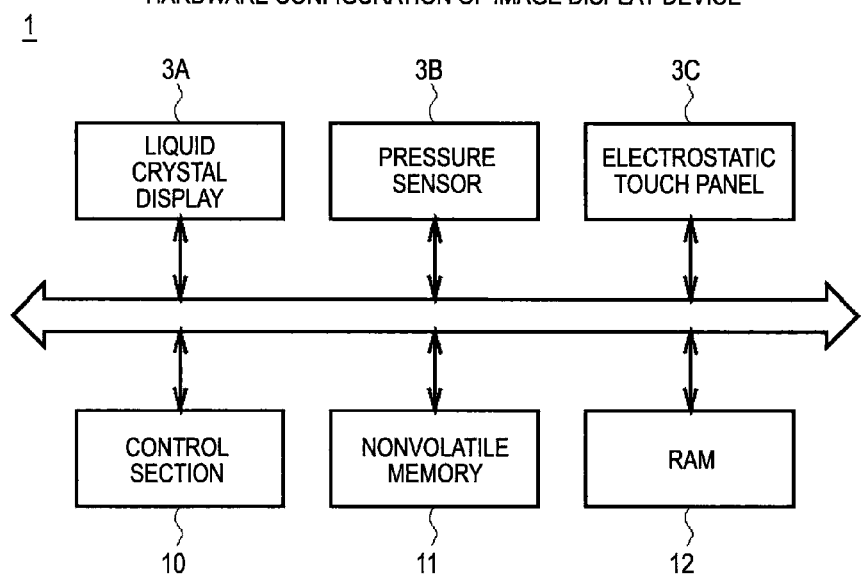
FIG. 3 is a block diagram illustrating the hardware configuration of the image display device.

Next, the hardware configuration of the image display device 1 will be described with reference to FIG. 3. The image display device 1 has the liquid crystal display 3A, the pressure sensor 3B, and the electrostatic touch panel 3C as described above. In addition, the image display device 1 has a control section 10, a nonvolatile memory 11, and a RAM (Random Access Memory) 12.

In the image display device 1, the control section 10 loads a program stored in the nonvolatile memory 11 to the RAM 12 and performs overall control according to the loaded program to thereby execute various kinds of processing.

That is, the control section 10 determines whether or not a user operation (gesture operation or pressure operation) on the operation screen has been performed on the basis of a detection result of the electrostatic touch panel 3C or pressure sensor 3B. Moreover, when it is determined that the user operation has been performed, the control section 10 receives the user operation as input, reads the image data, for example, from the nonvolatile memory 11 according to the input, and displays an image based on the image data on the liquid crystal display 3A.

In addition, the image data transmitted from such as a digital still camera connected through an external connection terminal (not shown) is stored in the nonvolatile memory 11.

The electrostatic touch panel 3C has a plurality of electrostatic sensors (not shown) arrayed in a matrix with respect to the operation screen. Each of the plurality of electrostatic sensors is configured to change the output value (also called a capacitance value) according to the capacitance which changes when a finger or the like approaches or touches the electrostatic sensor.

That is, the control section 10 determines whether or not a gesture operation on the operation screen has been performed by monitoring the capacitance value acquired from each of the plurality of electrostatic sensors.

In addition, the control section 10 can acquire the capacitance value and the position simultaneously from each of the plurality of electrostatic sensors. In addition, the control section 10 can recognize not only the position of a finger or the like, which touches or approaches the operation screen, but also the shape and size of a contact or approach portion on the basis of the capacitance value and the position which were acquired simultaneously from each of the plurality of electrostatic sensors.

In addition, the number of electrostatic sensors arrayed on the operation screen is generally smaller than the number of pixels on the liquid crystal display 3 due to problems, such as manufacturing cost. For this reason, the control section 10 increases the resolution of the electrostatic touch panel 3C by interpolating the capacitance value at the position, at which an electrostatic sensor is not provided, on the basis of the capacitance value and the position acquired from each electrostatic sensor.

Figure 4:
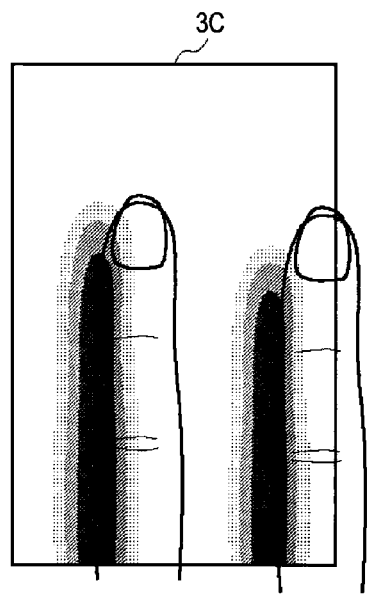
FIG. 4 is a schematic diagram presented to explain the capacitance change on an operation screen of an electrostatic touch panel.

Here, FIG. 4 shows a capacitance change on the operation screen when a user's finger actually approaches or touches the surface (that is, the operation screen) of the electrostatic touch panel 3C. As shown in FIG. 4, on the operation screen, the capacitance increases in a portion (hatched portion) that the user's finger approaches or touches, but the capacitance does not change in the other portions.

Accordingly, the control section 10 can recognize the shape and size of a finger or the like, which touches or approaches the operation screen, by specifying a portion where the capacitance has changed on the basis of the capacitance value and the position acquired from an electrostatic sensor of the electrostatic touch panel 3C.

In addition, the control section 10 can distinguish a portion, which is in contact with a finger, and a portion, which is close to the finger, on the operation screen on the basis of the capacitance variation.

Figure 5A:
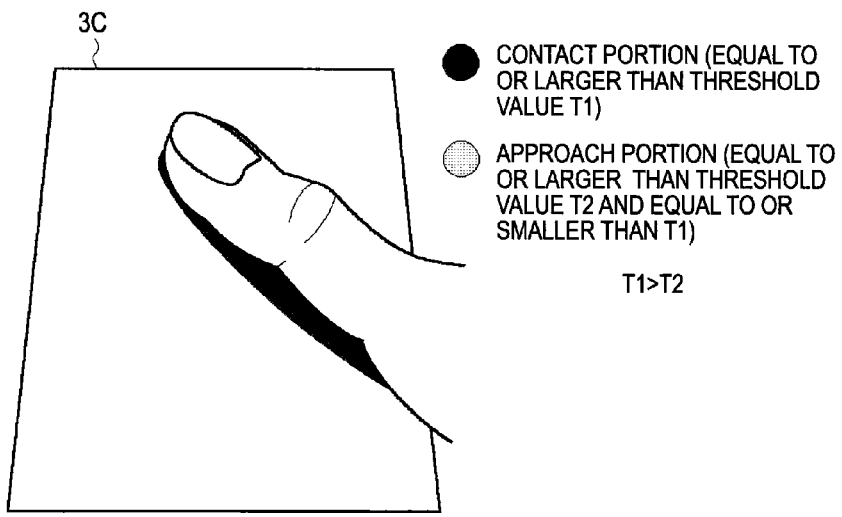
FIGS. 5A and 5B are schematic diagrams presented to explain the discrimination between a contact portion and an approach portion.
Figure 5B:
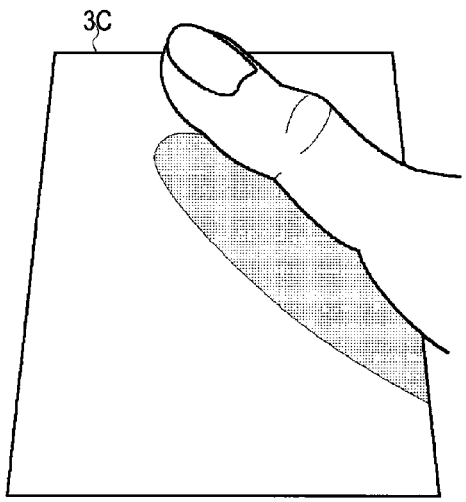

In practice, the capacitance variation on the operation screen increases as a finger approaches and reaches maximum when the finger comes in contact with the operation screen. Therefore, as shown in FIGS. 5A and 5B, the control section 10 can distinguish touch from approach by setting two steps of threshold values T1 and T2 (T1 is larger than T2) for the capacitance variation.

That is, the control section 10 determines a portion, in which the capacitance variation is smaller than the threshold value T2, on the operation screen to be a portion where there is neither contact of a finger nor approach of a finger. In addition, the control section 10 determines a portion, in which the capacitance variation is equal to or larger than the threshold value T2 and is smaller than the threshold value T1, to be a portion which a finger approaches. In addition, the control section 10 determines a portion, in which the capacitance variation is equal to or larger than the threshold value T1, to be a portion being in contact with a finger.

Thus, since the control section 10 can distinguish a portion being in contact with a finger from a portion close to the finger, the control section 10 may separately recognize the shape and size of a contact portion and the shape and size of an approach portion.

Similarly, it is also possible to separately recognize the shape and size of the outline of a finger and the shape and size of a cushion side of the finger when the user presses the operation screen with the cushion side of the finger. In addition, it will be described later how to use the shape and size recognized as described above.

On the other hand, the pressure sensor 3B outputs the value (also called a pressure value) of 0 to 255, for example, corresponding to the pressing force on the operation screen.

That is, the control section 10 determines whether or not a pressure operation on the operation screen has been performed by monitoring the pressure value acquired from the pressure sensor 3B.

Figure 6:
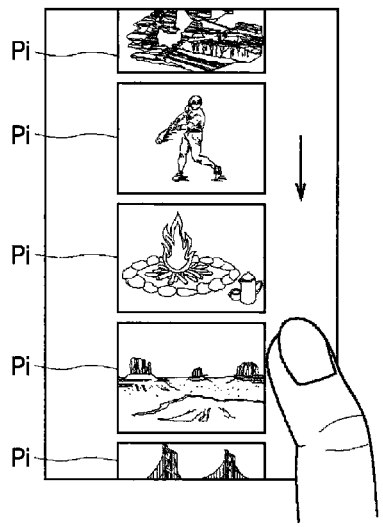
FIG. 6 is a schematic diagram illustrating the configuration of an image viewing screen.

Here, an image viewing operation in the image display device 1 will be described. The control section 10 of the image display device 1 displays an image viewing screen 20 shown in FIG. 6 on the liquid crystal display 3A in response to a predetermined user operation.

On the image viewing screen 20, a plurality of images Pi based on a plurality of image data items stored in the non-volatile memory 11 are displayed so as to be arrayed in a line in the vertical direction. In this case, only several images Pi can be displayed on the image viewing screen 20 at a time due to constraints such as the display size.

Accordingly, the control section 10 of the image display device 1 displays the other images Pi in order by scrolling the line of the images Pi, which are displayed on the image viewing screen 20, upward or downward in response to a predetermined user operation.

In this case, the control section 10 of the image display device 1 determines whether or not a pressure operation has been performed as a predetermined user operation. When it is determined that the pressure operation has been performed, the control section 10 scrolls the line of images Pi upward or downward. In addition, the control section 10 changes the scroll speed according to the pressing force when the pressure operation has been performed.

Figure 7:
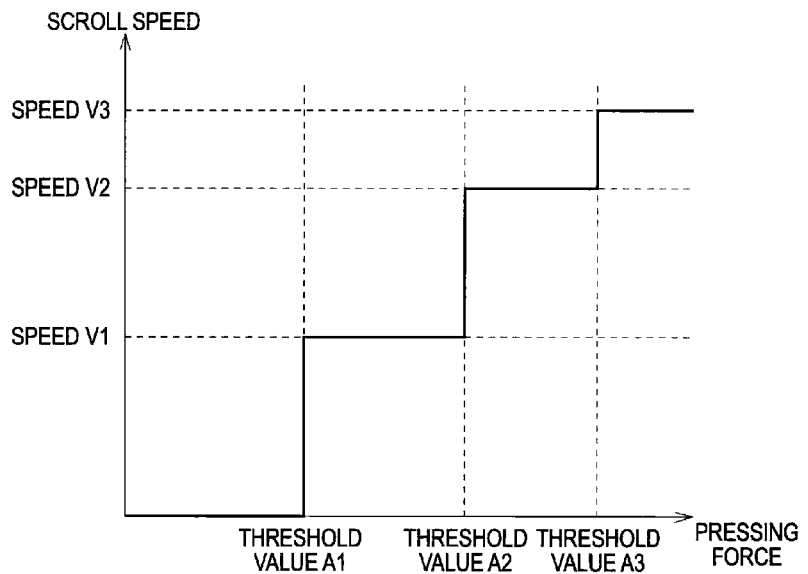
FIG. 7 is a graph illustrating the relationship between the pressing force and the scroll speed.

FIG. 7 shows the relationship between the pressing force and the scroll speed in this case. As shown in FIG. 7, the control section 10 sets three steps of threshold values A1, A2, and A3 (threshold value A1 is minimum and threshold value A3 is maximum) as threshold values of the pressing force.

In addition, if the pressure value acquired from the pressure sensor 3B does not exceed the minimum threshold value A1, the control section 10 determines that a pressure operation has not been performed and does not scroll the line of images Pi.

On the other hand, if the pressure value acquired from the pressure sensor 3B is equal to or larger than the threshold value A1, the control section 10 determines that a pressure operation has been performed and scrolls the line of images Pi. In addition, if the pressing force in this case is smaller than the threshold value A2, the control section 10 sets the scroll speed to a lowest speed V1 and scrolls the line of images Pi.

In addition, if the pressure value is equal to or larger than the threshold value A2 and smaller than the threshold value A3, the control section 10 sets the scroll speed to a speed V2 which is larger than the speed V1 and scrolls the line of images Pi. In addition, if the pressure value is equal to or larger than the threshold value A3, the control section 10 sets the scroll speed to a speed V3 which is larger than the speed V2 and scrolls the line of images Pi.

In addition, the control section 10 determines whether to scroll the line of images Pi upward on the image viewing screen 20 or to scroll the line of images Pi downward on the basis of whether an upper side from the middle of the image viewing screen 20 is pressed or a lower side is pressed, for example.

Thus, the image display device 1 displays the plurality of images Pi on the image viewing screen 20 so as to be arrayed in a line. In addition, the image display device 1 scrolls the line of images Pi in response to a pressure operation and changes the scroll speed according to the pressing force at that time. By such user interface, the image display device 1 realizes an intuitive image viewing operation.

Here, the pressure (that is, a pressing force) with which the operation screen is pressed changes with a difference in gripping power between a man and a woman or a difference between pressing fingers of thumb and index finger, for example. That is, even if a user intentionally presses the operation screen, the pressing force at that time changes with the gripping power, a pressing finger, and the like.

Accordingly, for example, when the threshold values A1 to A3 are the fixed values set on the basis of the average pressing force of persons, a situation may happen in which a user's intended operation for pressing the operation screen is not recognized or recognition as a pressure operation is performed regardless of a user's intention.

For this reason, in the image display device 1, the threshold values A1 to A3 are set on the basis of the shape and size (that is, the shape and size of a touch finger) of each of a contact portion and an approach portion when the user touches the operation screen with a finger. Hereinafter, setting of the threshold values A1 to A3 will be described.

[1-3. Setting of Threshold Value of Pressing Force]

First, a specific method of recognizing the shape and size (that is, the shape and size of a touch finger) of each of a contact portion and an approach portion when the user touches the operation screen with a finger, which is necessary when setting the threshold values A1 to A3 of the pressing force, will be described.

The control section 10 stores the capacitance value, which is acquired from each electrostatic sensor immediately after the start, in the RAM 12, for example. In addition, the control section 10 compares the capacitance value immediately after the start with the current capacitance value to calculate the difference (that is, the capacitance variation) for every electrostatic sensor. In addition, the control section 10 increases the resolution of the electrostatic touch panel 3C by interpolating the variation at the position, at which an electrostatic sensor is not provided, on the basis of the capacitance variation calculated for every electrostatic sensor.

Here, the control section 10 increases the resolution of the electrostatic touch panel 3C up to the same resolution as the number of pixels of the liquid crystal display 3, for example. In this way, the control section 10 can acquire the capacitance variation at the position corresponding to each pixel on the operation screen of the electrostatic touch panel 3C.

Moreover, on the basis of the capacitance variation at the position corresponding to each pixel on the operation screen and the above-described threshold values T1 and T2, the control section 10 separately recognizes the shape and size of a contact portion and the shape and size of an approach portion when the user touches the operation screen with a finger.

That is, the control section 10 determines a portion, in which the capacitance variation is equal to or larger than the threshold value T2 and smaller than the threshold value T1, on the operation screen to be an approach portion when touching the operation screen with a finger. In addition, the control section 10 determines a portion, in which the capacitance variation is equal to or larger than the threshold value T1, to be a contact portion when touching the operation screen with a finger.

In addition, the control section 10 treats each of the approach portion and the contact portion as an image by performing an imaging operation. In this case, the control section 10 performs an imaging operation of the approach portion by binarizing the capacitance variation at the position corresponding to each pixel on the operation screen according to whether or not the capacitance variation is equal to or larger than the threshold value T2. In addition, although the condition in which the capacitance variation is equal to or larger than the threshold value T2 is set instead of the condition in which the capacitance variation is equal to or larger than the threshold value T2 and smaller than the threshold value T1 because the outline of the outer side of the approach portion is important, the condition may also be set in which the capacitance variation is equal to or larger than the threshold value T2 and smaller than the threshold value T1.

In addition, the control section 10 performs an imaging operation of the contact portion by binarizing the capacitance variation at the position corresponding to each pixel according to whether or not the capacitance variation is equal to or larger than the threshold value T1.

In addition, the control section 10 recognizes the shape and size of each of the approach portion and the contact portion by performing predetermined image processing on each of an image (also called an approach image) of the approach portion and an image (also called a contact image) of the contact portion.

Figure 8:
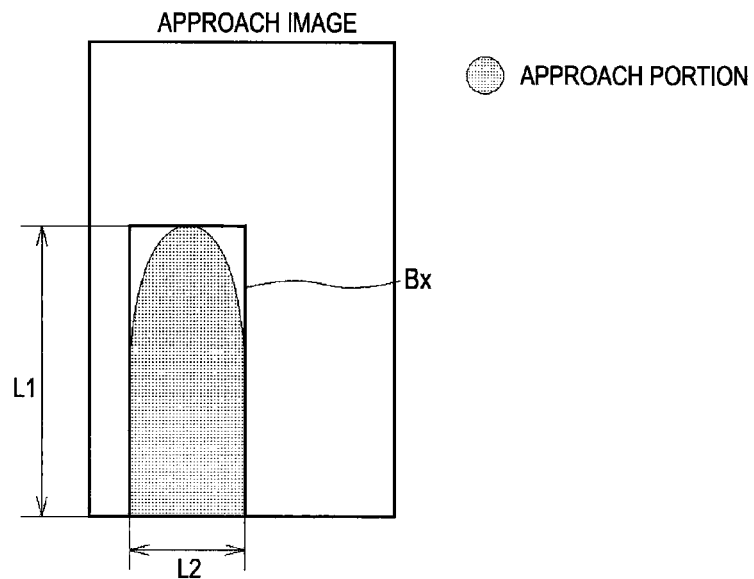
FIG. 8 is a schematic diagram illustrating an approach image when a touch is performed in a state where a finger is laid down.

Specifically, first, the control section 10 calculates a minimum box (rectangular box) Bx surrounding an approach portion by performing image processing on an approach image Np using a method of a directed boundary box or the like, as shown in FIG. 8.

In addition, the control section 10 recognizes the length L1 of the long side of the box Bx calculated as described above as the length (the unit is a pixel) of a finger and recognizes the length L2 of the short side as the thickness (the unit is a pixel) of the finger. That is, the size of the finger is recognized.

Figure 9:
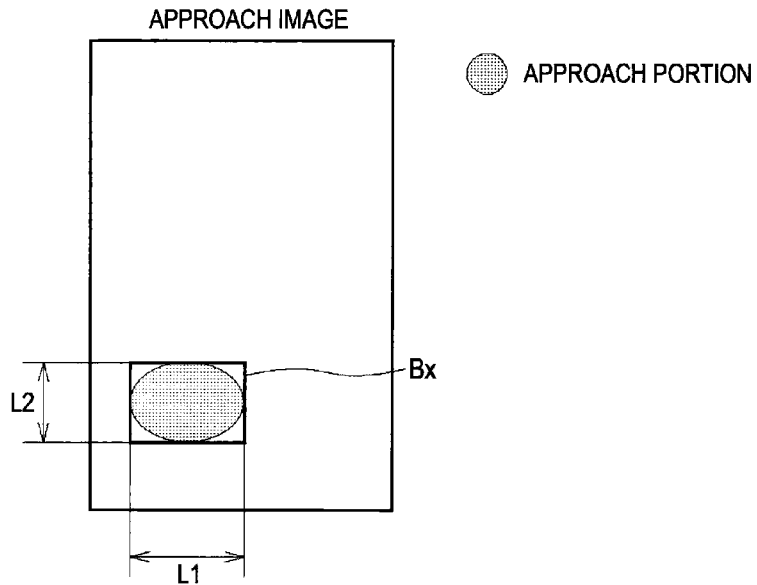
FIG. 9 is a schematic diagram illustrating an approach image when a touch is performed in a state where a finger is erect.

Here, the length L1 of the long side of the box Bx is recognized as the length of a finger and the length L2 of the short side is recognized as the thickness of the finger on the assumption that the operation screen is touched in a state where the finger is laid down. On the other hand, if the operation screen is touched in a state where a fingertip is erect as shown in FIG. 9, the relationship between the length L1 of the long side of the box Bx and the length L2 of the short side and the length of the finger and the thickness of the finger becomes opposite. Also in this case, the length L1 of the long side of the box Bx is recognized as the length of the finger and the length L2 of the short side is recognized as the thickness of the finger.

In addition, the control section 10 recognizes the shape (that is, outline shape of the touch finger) of the approach portion and the shape (shape of the cushion side or fingertip of the touch finger) of the contact portion by performing outline extraction processing on each of the approach image and the contact image.

In addition, the control section 10 estimates whether or not the touch finger is a thumb from the shape (that is, outline shape of the touch finger) of the approach portion, as shown in FIGS. 10A and 10B.

If a feature which is peculiar to the thumb is acquired from the outline shape of the touch finger, the control section 10 determines that the touch finger is a thumb. That is, the control section 10 compares a feature (for example, first indirect position) of the outline shape of the finger with a feature of the shape of the thumb stored in the nonvolatile memory 11, and determines that the touch finger is a thumb if the similarity is equal to or larger than a predetermined value.

In addition, the control section 10 estimates whether or not the touch is performed by the fingertip from the shapes and sizes of the approach portion and contact portion, as shown in FIGS. 11A and 11B. For example, if both the shape of the approach portion and the shape of the contact portion are circular and the size difference is smaller than a predetermined value, the control section 10 determines that the touch is performed by the fingertip.

Thus, from the shapes and sizes of the approach portion and contact portion, the control section 10 detects the thickness of the finger which touches the operation screen and also determines whether or not the finger is a thumb and whether or not the touch is performed by the fingertip.

Moreover, the control section 10 sets the threshold values A1 to A3 on the basis of the thickness of the finger, determination on whether or not the finger is a thumb (whether or not a thumb has been detected), and determination on whether or not the touch has been performed by a fingertip (whether or not a touch using a fingertip has been detected). Hereinafter, setting of the threshold values A1 to A3 will be described. In addition, the thickness of a finger, whether or not a thumb has been detected, and whether or not a touch using a fingertip has been detected are also called finger information herein.

In practice, the threshold values A1 to A3 suitable for the pressing force which can be estimated by combination of three items of the finger information, that is, the thickness of a finger, whether or not a thumb has been detected, and whether or not a touch using a fingertip has been detected are stored in the nonvolatile memory 11 beforehand, as shown in FIG. 12.

Here, as an example, it is assumed that the threshold values A1 to A3 of a total of twelve patterns obtained by three patterns (small, normal, and large) regarding the finger thickness, two patterns (yes, no) regarding whether or not a touch using a fingertip has been detected, and two patterns (yes, no) regarding whether or not a thumb has been detected are stored in the nonvolatile memory 11.

Moreover, as an example, a finger with a thickness (that is, the length of the short side of the box Bx) smaller than 64 pixels is classified as a thin finger, a finger with a size equal to or larger than 64 pixels and smaller than 96 pixels is classified as a finger with a normal thickness, and a finger with a size equal to or larger than 96 pixels is classified as a thick finger.

In addition, the threshold values A1 to A3 of each pattern are selected on the basis of the feature of a human being that the pressing force increases as the thickness of a finger increases, the pressing force when performing pressing with a thumb is larger than that when performing pressing with other fingers, and the pressing force when performing pressing with a fingertip is larger than that when performing pressing with the cushion side of the finger.

For example, in the pattern 10 where the thickness of a finger is small, a touch using a fingertip has not been detected, and a thumb has not been detected, the minimum threshold values A1 to A3 in all the patterns are selected. In this case, the threshold value A1 is 40−5, the threshold value A2 is 60−5, and the threshold value A3 is 70−5.

In addition, in the pattern 11 where the thickness of a finger in the pattern 10 is set to be normal, the threshold values A1 to A3 which are larger than those in the pattern 10 are selected. In this case, the threshold value A1 is 50−5, the threshold value A2 is 70−5, and the threshold value A3 is 80−5.

In addition, in the pattern 7 where a touch using a fingertip has been detected in the pattern 10, the threshold values A1 to A3 which are smaller than those in the pattern 10 are selected. In this case, the threshold value A1 is 40−10, the threshold value A2 is 60−10, and the threshold value A3 is 70−10.

In addition, in the pattern 4 where a thumb has been detected in the pattern 10, the threshold values A1 to A3 which are larger than those in the pattern 10 are selected. In this case, the threshold value A1 is 40+10, the threshold value A2 is 60+10, and the threshold value A3 is 70+10.

In addition, in the pattern 1 where a thumb has been detected and a touch using a fingertip has been detected in the pattern 10, the threshold values A1 to A3 which are larger than those in the pattern 10 and smaller than those in the pattern 4 are selected. In this case, the threshold value A1 is 40+5, the threshold value A2 is 60+5, and the threshold value A3 is 70+5.

Moreover, the control section 10 selects a pattern, which corresponds to the finger information acquired previously, from these twelve patterns.

For example, it is assumed that the control section 10 has acquired the finger information indicating that the thickness of a finger is 60 pixels, a thumb has been detected, and a touch using a fingertip has been detected. In this case, the control section 10 selects the pattern 1 corresponding to the case where the thickness of a finger is small, a thumb has been detected, and a touch using a fingertip has been detected.

The pattern 1 selected as described above becomes a pattern indicating the threshold values A1 to A3 suitable for the pressing force which can be estimated from the finger information.

In addition, the control section 10 sets the threshold values A1 to A3, which are indicated in the selected pattern (for example, pattern 1), as the threshold values A1 to A3 to be used this time and stores the threshold values A1 to A3 in the nonvolatile memory 11.

In this manner, the control section 10 sets the threshold values A1 to A3 on the basis of the shapes and sizes of the contact portion and approach portion when the user touches the operation screen with a finger.

Using the threshold values A1 to A3 set as described above, the control section 10 performs appropriate calibration (adjustment) of the threshold values A1 to A3 according to the pressing force when the user actually presses the operation screen. Hereinafter, the adjustment of such threshold values A1 to A3 will be specifically described.

[1-4. Adjustment of Threshold Value Based on Actual Pressing Force]

It is assumed that the user presses (that is, pushes) the operation screen of the touch panel 3C in a state where the image viewing screen 20 is displayed on the liquid crystal display 3A after setting the threshold values A1 to A3 as described above.

In this case, if the pressure value acquired from the pressure sensor 3B is equal to or larger than the minimum threshold value A1, the control section 10 determines that a pressure operation has been performed and scrolls the line of images Pi at a scroll speed corresponding to the pressing force at this time.

On the other hand, if the pressure value acquired from the pressure sensor 3B does not exceed the minimum threshold value A1, the control section 10 does not scroll the line of images Pi. In this case, the control section 10 determines whether or not the user has pressed the operation screen intentionally on the basis of whether or not the pressure value acquired from the pressure sensor 3B is equal to or larger than a predetermined value (for example, 80% or more of the threshold value A1) smaller than the threshold value A1.

Here, if the user has pressed the operation screen intentionally, it means that the pressure value at the time of the intended pressing does not exceed the threshold value A1, that is, the current threshold value A1 is set to be higher than the actual pressing force of the user. In this case, the control section 10 adjusts the threshold value A1.

Specifically, when a person presses the operation screen to apply arbitrary pressure, the control section 10 adjusts the threshold value A1 using the characteristic in which the pressure momentarily overshoots (large pressure is momentarily applied) immediately before the pressure is finally settled. In addition, the characteristic is also called an overshoot characteristic.

Figure 13A:
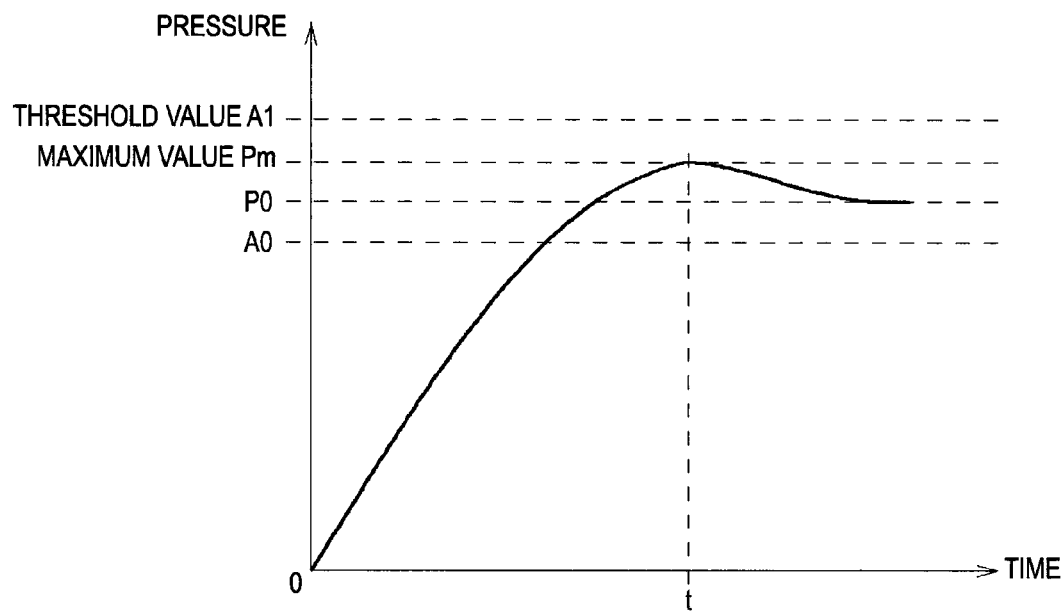
FIGS. 13A and 13B are graphs illustrating the pressure change in the case of having an overshoot characteristic.
Figure 13B:
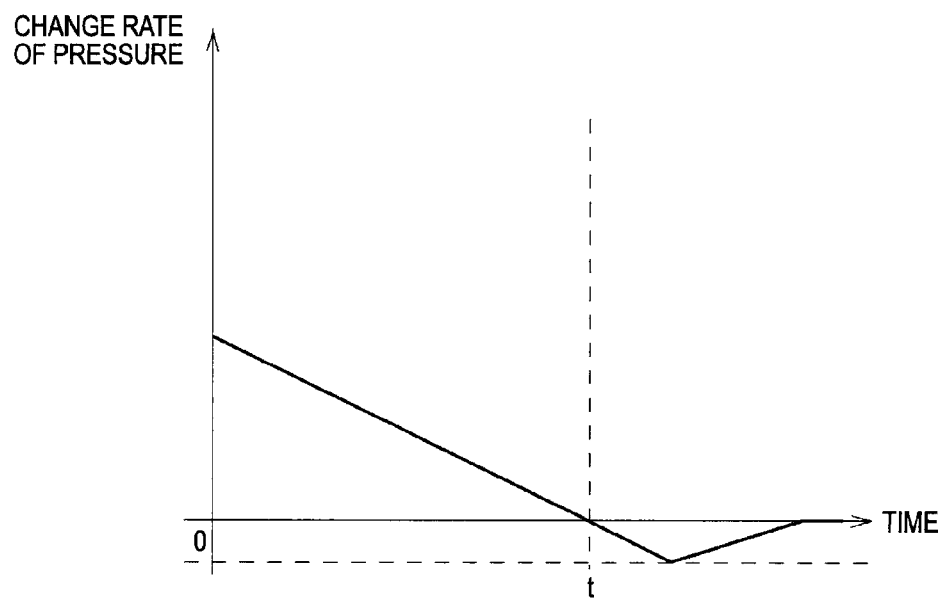

A change in the pressing force based on the overshoot characteristic is shown in FIGS. 13A and 13B. As shown in FIG. 13A, when a person presses the operation screen to apply predetermined pressure (that is, a pressing force), the pressure value increases momentarily from 0 to the maximum value Pm and then decreases to reach the value P0.

Here, when the pressure value is equal to or larger than the predetermined value A0 (for example, 80% of the threshold value A1), the control section 10 determines that the pressure value does not exceed the threshold value A1 even though the user has pressed the operation screen intentionally.

In this case, the control section 10 regards the maximum value Pm as an actual pressing force when the user has pressed the operation screen intentionally and adjusts the current threshold value A1 on the basis of the difference between the maximum value Pm and the current threshold value A1.

Specifically, the control section 10 calculates the change rate of the pressure value on the basis of the pressure value acquired from the pressure sensor 3B at predetermined time intervals and stores it in the RAM 12, and also calculates the inclination of the change rate. When it is detected that the inclination has changed from minus to plus, the control section 10 determines that the overshoot characteristic has been acquired from the pressure value change.

In this case, the control section 10 treats, as the maximum value Pm, a pressure value at a point of time t when the change rate of the pressure value has changed from plus to minus (that is, a pressure value at a point of time when the pressure value starts to decrease).

In addition, the control section 10 adjusts the threshold value A1 by subtracting, for example, 20% of the difference between the current threshold value A1 and the maximum value Pm acquired as described above from the current threshold value A1.

For example, assuming that the current threshold value A1 is "50" corresponding to "40+10", the maximum value Pm is "45", and the difference is "5", 20% of the difference is "1". In this case, the control section 10 adjusts the threshold value A1 to "49" corresponding to "50−1" by subtracting 20% of the difference between the maximum value Pm and the current threshold value A1 from the current threshold value A1.

The control section 10 also adjusts the threshold values A2 and A3 by subtracting 20% (in this case, "1") of the difference between the maximum value Pm and each of the threshold values A2 and A3 similar to the threshold value A1.

Subsequently, the control section 10 appropriately adjusts the threshold values A1 to A3 in such a manner described above whenever the operation screen is pressed by the user. As a result, the threshold values A1 to A3 are gradually optimized according to the pressing force of the user.

In this way, the control section 10 adjusts the threshold values A1 to A3 appropriately according to the pressing force when the user actually presses the operation screen.

As described up to now, the image display device 1 is configured to set the threshold values A1 to A3 on the basis of the finger information which is acquired from the shapes and sizes of the contact portion and approach portion when the user touches the operation screen with a finger.

That is, the image display device 1 selects a pattern, which corresponds to the finger information acquired this time, from the patterns of the threshold values A1 to A3 selected on the basis of the pressing force which can be estimated from the finger information, the patterns being prepared for various kinds of finger information. In addition, the image display device 1 sets the threshold values A1 to A3, which are indicated by the selected pattern, as the initial threshold values A1 to A3.

In this way, the image display device 1 can set the threshold values A1 to A3 suitable for the pressing force of the user which can be estimated from the finger information.

Moreover, after setting the threshold values A1 to A3, the image display device 1 adjusts the threshold values A1 to A3 appropriately according to the pressing force when the user actually presses the operation screen.

In this way, the image display device 1 can optimize the threshold values A1 to A3, which are set on the basis of the pressing force of the user which can be estimated from the finger information, according to the pressing force when the user actually presses the operation screen.

[1-5. Threshold Value Setting Procedure]

Figure 14:
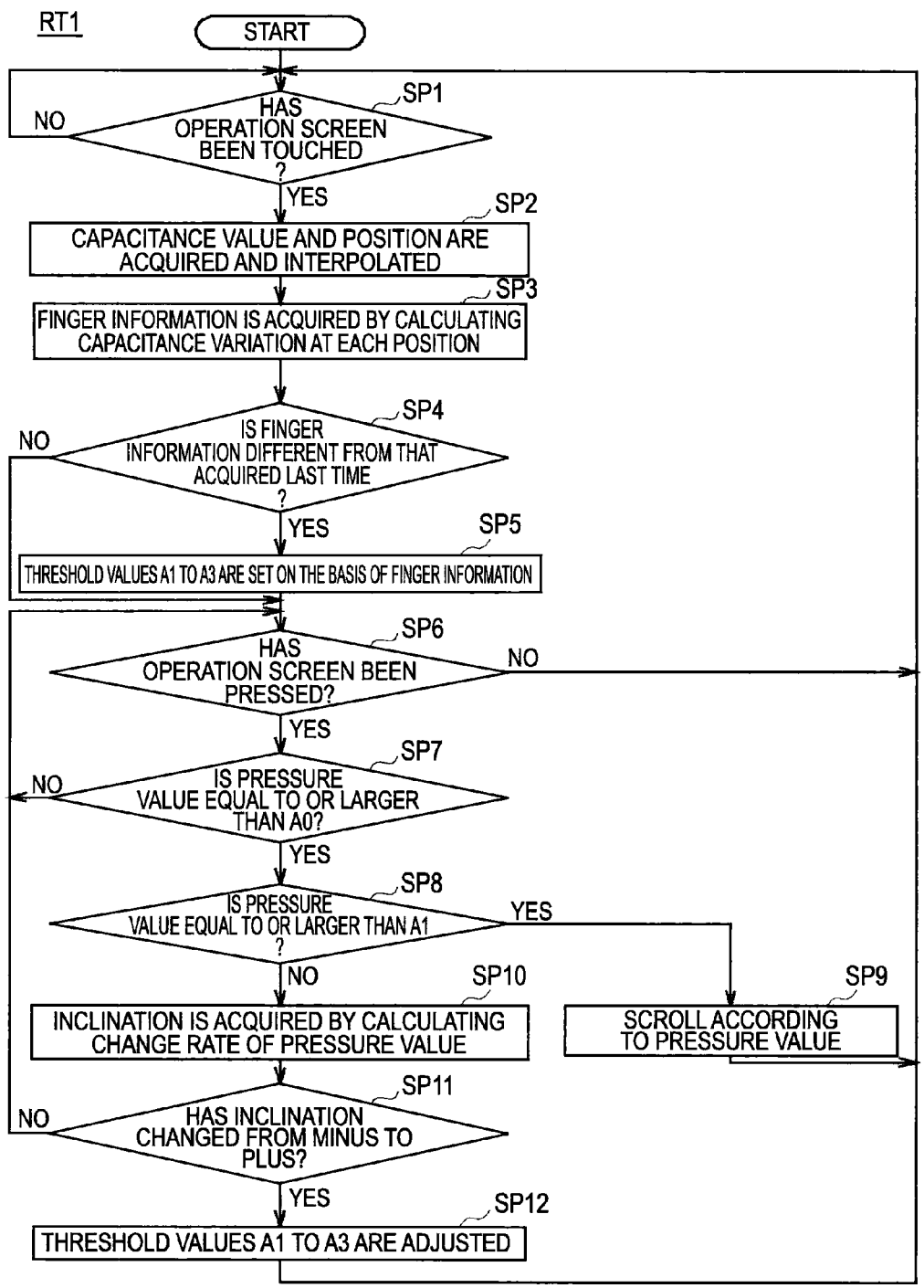
FIG. 14 is a flowchart illustrating the threshold value setting procedure.

Next, a procedure (also called a threshold value setting procedure) when performing the setting and adjustment of the threshold values A1 to A3 will be described using a flow chart shown in FIG. 14. This threshold value setting procedure RT1 is a procedure of processing that the control section 10 of the image display device 1 executes according to a program written in the nonvolatile memory 11.

For example, when the power supply of the image display device 1 is turned on, the control section 10 starts the threshold value setting procedure RT1 to display the image viewing screen 20 and proceeds to step SP1. In step SP1, the control section 10 determines whether or not the operation screen of the electrostatic touch panel 3C has been touched by a finger (that is, whether or not the operation screen of the electrostatic touch panel 3C has come in contact with a finger).

In this case, the control section 10 determines whether or not the operation screen has been touched by a finger on the basis of whether or not there is a portion, in which the capacitance has increased up to the threshold value T1 or more, on the operation screen of the electrostatic touch panel 3C.

The control section 10 waits until a positive result is obtained in step SP1, that is, until the operation screen is touched. When a positive result is obtained by touching on the operation screen, the process proceeds to step SP2.

In step SP2, the control section 10 acquires the capacitance value and the position from each of the plurality of electrostatic sensors of the electrostatic touch panel 3C. In addition, the control section 10 increases the resolution by calculating the capacitance variation at each position and interpolating the variation at the position at which an electrostatic sensor is not provided. Then, the process proceeds to step SP3.

In step SP3, the control section 10 discretizes the capacitance variation at each position on the operation screen, for example, at predetermined distances, and recognizes the shapes and sizes of the contact portion and approach portion of the finger on the operation screen on the basis of the capacitance variation at each position. Then, the control section 10 acquires the finger information (thickness of a finger, information regarding whether or not a thumb has been detected, and information regarding whether or not pressing using a fingertip has been detected) from these shapes and sizes and stores the acquired finger information in the nonvolatile memory 11. Then, the process proceeds to step SP4.

In step SP4, the control section 10 determines whether or not the finger information acquired this time is different from the finger information acquired last time. Here, it is assumed that at least the finger information acquired this time and the finger information acquired last time are stored in the nonvolatile memory 11.

Obtaining the positive result in step SP4 means that the finger information has changed, that is, a different user from the user who operated last time is operating, for example. In this case, the control section 10 proceeds to step SP5. In step SP5, the control section 10 selects a pattern corresponding to the finger information acquired this time and stores the threshold values A1 to A3, which are indicated in the pattern, in the nonvolatile memory 11 as the threshold values A1 to A3 to be used this time, and proceeds to step SP6.

On the other hand, obtaining the negative result in step SP4 means that the finger information has not changed, that is, an operation is performed with the same finger as in the previous operation, for example. In this case, the control section 10 skips step SP4. That is, the control section 10 sets the threshold values A1 to A3, which were set last time, as the current threshold values A1 to A3 and proceeds to step SP6.

In step SP6, the control section 10 determines whether or not the operation screen has been pressed. In this case, the control section 10 determines whether or not the operation screen has been pressed on the basis of whether or not the pressure value equal to or larger than "1", for example, has been detected from the pressure sensor 3B in a state where the finger is touching the operation screen.

Obtaining a negative result in step SP6 means that the operation screen has not been pressed. In this case, the control section 10 returns to step SP1.

On the other hand, obtaining a positive result in step SP6 means that the operation screen has been pressed. In this case, the control section 10 proceeds to step SP7.

In step SP7, the control section 10 determines whether or not the pressure value acquired from the pressure sensor 3B is equal to or larger than at least the predetermined value A0 (for example, the threshold value A1×0.8).

Obtaining a negative result in step SP7 means that the user has not pressed the operation screen intentionally. In this case, the control section 10 returns to step SP6.

On the other hand, obtaining a positive result in step SP7 means that the user has pressed the operation screen intentionally. In this case, the control section 10 proceeds to step SP8.

In step SP8, the control section 10 determines whether or not the pressure value acquired from the pressure sensor 3B is equal to or larger than the threshold value A1.

Obtaining a positive result in step SP8 means that a pressure operation for scrolling the line of images Pi displayed on the image viewing screen 20 has been performed. In this case, the control section 10 proceeds to step SP9. In step SP9, the control section 10 scrolls the line of images Pi at the scroll speed corresponding to the pressing force at this time and then returns to step SP1.

On the other hand, obtaining a negative result in step SP8 means that the pressure value has not reached the threshold value A1 even though the user pressed the operation screen intentionally, that is, a pressure operation for scrolling the line of images Pi has not been performed. In this case, the control section 10 proceeds to step SP10 without scrolling the line of images Pi.

In step SP10, the control section 10 calculates and stores the change rate of the pressure value on the basis of the pressure value acquired from the pressure sensor 3B at predetermined time intervals and also calculates the inclination of the change rate, and proceeds to step SP11.

In step SP11, the control section 10 determines whether or not the inclination of the change rate of the pressure value has changed from minus to plus.

Obtaining a positive result in step SP11 means that the overshoot characteristic has been acquired from the pressure value change. In this case, the control section 10 proceeds to step SP12.

In step SP12, the control section 10 adjusts the threshold value A1 on the basis of the difference between the maximum value Pm and the current threshold value A1 using, as the maximum value Pm, the pressure value at a point of time when the change rate of the pressure value has changed from plus to minus. Then, the process returns to step SP1. Here, the control section 10 also adjusts the threshold values A2 and A3 similarly.

On the other hand, obtaining a negative result in step SP11 means that the overshoot characteristic has not been acquired from the pressure value change. In this case, the control section 10 returns to step SP6 without adjusting the threshold values A1 to A3.

Through such threshold value setting procedure RT1, the image display device 1 can perform setting and adjustment of the threshold values A1 to A3 of the pressing force.

[1-6. Operations and Effects]

In the above-described configuration, the control section 10 of the image display device 1 displays the image viewing screen 20, in which the plurality of images Pi are arrayed in a line, on the liquid crystal display 3A.

Moreover, if the operation screen of the electrostatic touch panel 3C is pressed in a state where the image viewing screen 20 is displayed, the control section 10 scrolls the line of images Pi at a scroll speed corresponding to the pressing force at this time.

In this case, the control section 10 changes the scroll speed in three steps on the basis of three steps of threshold values A1 to A3 set for the pressing force.

On the other hand, the control section 10 recognizes the shape and size of a finger when the user actually touches the operation screen with the finger from the capacitance change at each position on the operation screen and sets the threshold values A1 to A3 on the basis of the shape and size.

That is, from the shape and size of the finger that touches the operation screen, the control section 10 detects the thickness of the touch finger, whether or not the finger is a thumb, and whether or not the touch is performed by a fingertip. Then, using the detection result as the finger information, the image display device 10 selects a pattern, which corresponds to the finger information acquired this time, from the patterns of the threshold values A1 to A3 suitable for the pressing force which were estimated from the finger information, the patterns being prepared for various kinds of finger information.

Then, the control section 10 sets the values indicated in the selected pattern as the current threshold values A1 to A3.

In this way, the image display device 1 can set the threshold values A1 to A3 suitable for the pressing force of the user which is estimated from the shape and size of the touch finger.

Moreover, after setting the threshold values A1 to A3, the control section 10 of the image display device 1 adjusts the threshold values A1 to A3 appropriately according to the pressing force when the user actually presses the operation screen.

In this way, the image display device 1 can adjust the threshold values A1 to A3, which are set on the basis of the pressing force of the user which can be estimated from the finger information, to the values suitable for the pressing force when the user actually presses the operation screen.

In this case, if the pressure value acquired from the pressure sensor 3B is equal to or larger than 80% of the threshold value A1, for example, the control section 10 determines that the pressure value does not exceed the threshold value A1 even though the user has pressed the operation screen intentionally and adjusts the threshold values A1 to A3.

In this way, it is possible to prevent the image display device 1 from adjusting the threshold values A1 to A3 on the basis of the weak pressing force applied when the user touches the operation screen, for example.

In addition, when a person presses the operation screen to apply arbitrary pressure, the control section 10 adjusts the threshold value A1 using the characteristic in which the pressure momentarily overshoots immediately before the pressure is finally settled.

That is, the control section 10 regards the value immediately before the pressing force acquired from the pressure sensor 3B is eventually applied as an actual pressing force when the user presses the operation screen intentionally and adjusts the current threshold value A1 on the basis of the difference between the value and the current threshold value A1.

In this way, the image display device 1 can correctly detect the actual pressing force when the user presses the operation screen intentionally. As a result, the threshold values A1 to A3 can be adjusted to the threshold values A1 to A3 suitable for the actual pressing force.

According to the above-described configuration, since the image display device 1 can set the threshold values A1 to A3 suitable for the pressing force when a pressure operation is actually performed, the pressure operation of a user can be more reliably recognized than in the related art.

[1-7. Functional Configuration of the Image Display Device]

Figure 15:
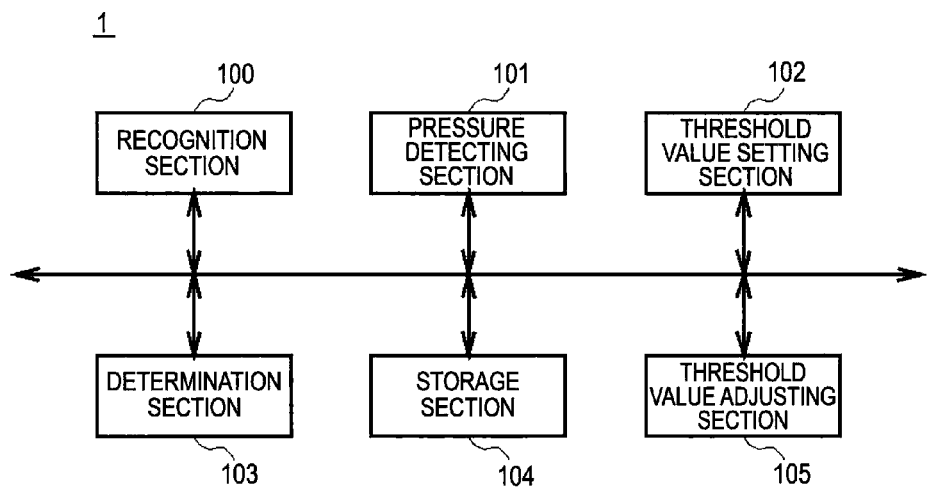
FIG. 15 is a block diagram illustrating the functional configuration of the image display device.

Next, the functional configuration of the image display device 1 focused on the setting and adjustment of the threshold values A1 to A3 will be described. As shown in FIG. 15, the image display device 1 includes a recognition section 100, a pressure detecting section 101, a threshold value setting section 102, a determination section 103, a storage section 104, and a threshold value adjusting section 105.

The recognition section 100 recognizes the shape of an object (that is, a user's finger) that touches the operation screen. The pressure detecting section 101 detects the pressure of the object (that is, pressing force from a finger) on the operation screen. The threshold value setting section 102 sets the threshold values A1 to A3 of the pressure, which are values for determining a pressure operation on the operation screen, on the basis of the shape of the object recognized by the recognition section 100. The determination section 103 determines whether or not a pressure operation has been performed on the operation screen on the basis of the pressure detected by the pressure detecting section 101 and the threshold values A1 to A3 set by the threshold value setting section 102. The storage section 104 stores the threshold values A1 to A3, which are selected on the basis of the pressure of the object which can be estimated from the shape of the object, for various shapes of objects (that is, for every finger information). The threshold value adjusting section 105 adjusts the threshold values A1 to A3 according to the pressure of the object detected by the pressure detecting section 101 after the threshold values A1 to A3 are set by the threshold value setting section 102.

That is, the recognition section 100 described herein is a functional section equivalent to the electrostatic touch panel 3C and the control section 10 with the above-described hardware configuration. In addition, the pressure detecting section 101 is a functional section equivalent to the pressure sensor 3B with the above-described hardware configuration. In addition, the threshold value setting section 102, the determination section 103, and the threshold value adjusting section 105 are functional sections equivalent to the control section 10 with the above-described hardware configuration. In addition, the storage section 104 is a functional section equivalent to the nonvolatile memory 11 with the above-described hardware configuration.

By such functional configuration, the image display device 1 can realize the setting and adjustment of the threshold values A1 to A3 described above. In addition, the circuit configuration of the image display device 1 is not limited to the hardware configuration shown in FIG. 3 as long as the circuit configuration is a hardware configuration capable of realizing such functional configuration.

<2. Other Embodiments>

[2-1. Second Embodiment]

In the above-described embodiment, the thickness of a touch finger, whether or not the finger is a thumb, and whether or not the touch is performed by a fingertip are detected from the shape and size of the finger that touches the operation screen and the threshold values A1 to A3 are set on the basis of the detection result.

Figure 16A:
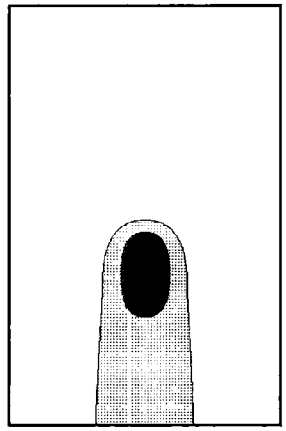
FIGS. 16A and 16B are schematic diagrams presented to explain the determination on whether or not a touch finger is a woman's finger in another embodiment.
Figure 16B:
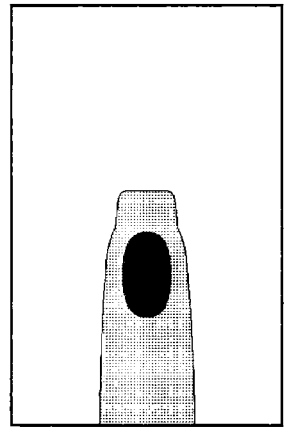

However, the present invention is not limited to those described above. For example, as shown in FIGS. 16A and 16B, the sex of a user who performs a touch operation may be detected from the outline shape of the finger that touches the operation screen.

Specifically, for example, when a women-specific feature (for example, artificial nail) is acquired from an image of an approach portion, the control section 10 determines that the user who performs the touch operation is a woman.

In this case, for example, patterns of the threshold values A1 to A3 shown in FIG. 12 are separately prepared for men and women (that is, 24 patterns of 12 patterns×2 are prepared). Here, since the pressing force of a woman is generally smaller than that of a man, the threshold values A1 to A3 indicated in a pattern for women are selected to be lower than the threshold values A1 to A3 indicated in a pattern for men.

In this way, it is possible to set the threshold values A1 to A3 which are more suitable for the pressing force of a user.

In addition to detecting the sex of a user from the outline shape of a finger as described above, it is also possible to register the sex of a user in the image display device 1 as user information and to determine the sex of a user on the basis of the user information.

In this case, it is preferable that the control section 10 of the image display device 1 displays, for example, a user information registration screen (not shown) on the liquid crystal display 3A and the user information input through the user information registration screen is stored in the nonvolatile memory 11.

On the other hand, it is also possible to detect only the thickness of a finger, which touches the operation screen, from the shape and size of the touch finger and to set the threshold values A1 to A3 on the basis of only the detection result. In this case, as shown in FIG. 17, it is preferable to prepare the threshold values A1 to A3 of three patterns corresponding to large finger thickness, normal finger thickness, and small finger thickness, for example.

Moreover, in this case, it is sufficient only to calculate the minimum box Bx surrounding the approach portion as shown in FIG. 8. Accordingly, a time necessary for setting of the threshold values A1 to A3 can be shortened compared with the case where it is detected whether or not the finger is a thumb and whether or not the touch is performed by a fingertip.

In addition, the present invention is not limited to those described above, and it is also possible to detect only whether or not a finger, which touches the operation screen, is a thumb from the shape of the touch finger (in this case, the size is not necessary) and to set the threshold values A1 to A3 on the basis of only the detection result. In this case, it is preferable to prepare the threshold values A1 to A3 of two patterns when the touch finger is a thumb and the touch finger is not a thumb, for example.

In addition, the present invention is not limited to those described above, and the threshold values A1 to A3 may be set on the basis of arbitrary information of the information acquired from one or both of the shape and size of a finger, such as the thickness of a finger, whether or not the finger is a thumb, whether or not the touch is performed by a fingertip, and the sex.

[2-2. Third Embodiment]

In the embodiment described above, the threshold values A1 to A3 are set when the operation screen is touched by a user's finger after displaying the image viewing screen 20.

However, the present invention is not limited to those described above. For example, it is also possible to display an icon for displaying the image viewing screen 20 on the liquid crystal display 3A and to set the threshold values A1 to A3 when the icon is touched by the user's finger.

In this case, the control section 10 of the image display device 1 displays a plurality of icons corresponding to various screens on the liquid crystal display 3A, for example. In addition, the control section 10 displays the image viewing screen 20 on the liquid crystal display 3A and sets the threshold values A1 to A3 when an icon for displaying the image viewing screen 20 among the plurality of icons is touched by a user's finger.

In addition, the present invention is not limited to those described above. For example, it is also possible to display a threshold value setting screen (not shown) for setting the threshold values A1 to A3 on the liquid crystal display 3A and to set the threshold values A1 to A3 when a predetermined place of the threshold value setting screen is touched by a user's finger.

In this case, the control section 10 of the image display device 1 displays the threshold value setting screen on the liquid crystal display 3A in response to a predetermined user operation. Then, the control section 10 sets the threshold values A1 to A3 when a predetermined place of the threshold value setting screen is touched by the user's finger.

In addition, the threshold value setting screen may be a part of the above-described user information registration screen. That is, the control section 10 may set the threshold values A1 to A3 when a predetermined place of the threshold value setting screen is touched after displaying the user information registration screen.

In this case, for example, the threshold values A1 to A3 may be set when a place that is necessarily touched on the user information registration screen, such as a registration button for registering the user information input through the user information registration screen on the image display device 1, is touched.

In this way, the image display device 1 can set the threshold values A1 to A3 while making a user input the user information on the user information registration screen.

In addition, the present invention is not limited to those described above, and it is also possible to prompt a user to touch a predetermined place by displaying the text information, which gives the instruction to touch a predetermined place on the operation screen, on the liquid crystal display 3A.

[2-3. Fourth Embodiment]

In the embodiment described above, when the power supply of the image display device 1 is turned on, the threshold value setting procedure RT1 starts to set the threshold values A1 to A3. Then, the image display device 1 acquires the finger information from the shape of a user's finger whenever the operation screen is touched by the user's finger and then resets the threshold values A1 to A3 when the finger information is different from the previous finger information.

However, the present invention is not limited to those described above. For example, the threshold values A1 to A3 may be set only when a power supply is turned on, considering that the same user performs an operation with the same finger in many cases until the power supply is turned off after being turned on.

Moreover, for example, the threshold values A1 to A3 may be set only when a user updates the user information on the user information registration screen described above, without being limited to those described above.

[2-4. Fifth Embodiment]

In the embodiment described above, the shapes and sizes of contact portion and approach portion when a user touches the operation screen with a finger are determined on the basis of the capacitance variation on the operation screen of the electrostatic touch panel 3C. In addition, the image display device 1 sets the threshold values A1 to A3 on the basis of the shapes and sizes of the contact portion and approach portion.

However, the present invention is not limited to those described above. For example, the threshold values A1 to A3 may be set on the basis of the shape and size of either a contact portion or an approach portion.

Here, when the threshold values A1 to A3 are set on the basis of only the shape and size of a contact portion, only the thickness of the touch finger is detected, for example. In this case, it is preferable to detect the thickness of a finger from a minimum box surrounding the contact portion and to set the threshold values A1 to A3 on the basis of the thickness in the same manner as in the second embodiment.

In addition, when the threshold values A1 to A3 are set on the basis of only the shape and size of an approach portion, whether or not the touch is performed by a fingertip is detected on the basis of only whether or not the shape of the approach portion is circular. In this way, not only the thickness of a finger and whether or not the finger is a thumb can be detected but also whether or not the touch is performed by a fingertip can be detected from the shape and size of the approach portion.

[2-5. Sixth Embodiment]

In the embodiment described above, the thickness of a finger, whether or not the finger is a thumb, and whether or not the touch is performed by a fingertip are detected on the basis of the shapes and sizes of contact portion and approach portion when the user touches the operation screen with the finger.

Here, a method of detecting the thickness of a finger, whether or not the finger is a thumb, and whether or not the touch is performed by a fingertip on the basis of the shapes and sizes of the contact portion and approach portion is not limited to the method described in the above embodiment, and other existing methods may also be used.

[2-6. Seventh Embodiment]

In the embodiment described above, it is determined that a user has pressed the operation screen intentionally at least when the pressing force acquired from the pressure sensor 3B is equal to or larger than the predetermined value A0 (for example, 80% of the threshold value A1) smaller than the threshold value A1.

However, the present invention is not limited to those described above. For example, it may be determined that a user has pressed the operation screen intentionally at least when the overshoot characteristic is acquired from a change in pressing force.

That is, the control section 10 calculates the change rate of the pressing force on the basis of the pressing force acquired from the pressure sensor 3B and determines that the overshoot characteristic has been acquired when the inclination changes from minus to plus. In this case, preferably, the control section 10 determines at least that the user has pressed the operation screen intentionally.

In addition, the control section 10 may determine that the user has pressed the operation screen intentionally when the maximum value of the pressing force acquired from the pressure sensor 3B is equal to or larger than the predetermined value A0 and the overshoot characteristic has been acquired.

[2-7. Eighth Embodiment]

In the embodiment described above, the threshold value A1 is adjusted by subtracting 20% of the difference between the maximum value Pm of the pressure value and the threshold value A1 from the current threshold value A1.

However, the present invention is not limited to those described above. For example, the threshold value A1 may also be adjusted by subtracting the difference itself from the threshold value A1. In addition, if the threshold value A1 is adjusted by tens of percent of the difference like the above-described embodiment, an abrupt change in the threshold value A1 is prevented. As a result, an abrupt change in the relationship between the pressing force and the scroll speed can be prevented. On the other hand, if the threshold value A1 is adjusted using the difference itself, the threshold value A1 can be immediately adjusted to a value suitable for the actual pressing force of the user.

[2-8. Ninth Embodiment]

In the embodiment described above, three steps of threshold values A1 to A3 are set as threshold values of the pressing force. However, one or two steps of threshold values may be set or four or more steps of threshold values may be set without being limited to those described above.

[2-9. Tenth Embodiment]

In the embodiment described above, the change rate of the pressing force acquired from the pressure sensor 3B is calculated and the pressure when the inclination has changed from minus to plus is set as the maximum value Pm. In addition, the image display device 1 regards the maximum value Pm as the actual pressing force when the user has pressed the operation screen.

Here, other methods may be used as the method of acquiring the maximum value Pm. For example, a maximum value of the pressing force acquired within a predetermined time after the pressing force acquired from the pressure sensor 3B has reached the predetermined value A0 (for example, 80% of the threshold value A1) or more may be set as the maximum value Pm.

Moreover, instead of the maximum value acquired within a predetermined time, a value when finally settled may be regarded as the actual pressing force.

[2-10. Eleventh Embodiment]

In the embodiment described above, the electrostatic touch panel 3C is provided in the image display device 1 as a device for specifying the shape and size of a finger of a user who touches the operation screen.

However, the present invention is not limited to those described above, and other various devices, such as a resistive touch panel, may also be provided in the image display device 1 as long as they are devices capable of specifying the shape and size of a finger that touches the operation screen.

In addition, a liquid crystal display with a touch panel function may be provided in the image display device 1 instead of the electrostatic touch panel 3C and the liquid crystal display 3A. In this case, it is preferable that the pressure sensor 3B is disposed behind the liquid crystal display, for example.

In addition, the present invention is not limited to the liquid crystal display, and other various displays, such as an EL (Electroluminescence) display, may also be used.

[2-11. Twelfth Embodiment]

In the embodiment described above, the present invention is applied to the image display device 1 as an information processing apparatus. However, the present invention is not limited to being applied to the image display device 1 and may be applied to other various information processing apparatuses as long as the information processing apparatus has an operation input section which can be operated by pressure. For example, the present invention may be applied to a notebook type personal computer or portable audio player having a touchpad which can be operated by pressure.

[2-12. Thirteenth Embodiment]

In addition, the present invention is not limited to the embodiments described above. That is, the present invention may also be applied to the case where some or all of the above embodiments are arbitrarily combined or the case where some parts of the embodiments are extracted.

The present invention can be widely used for an information processing apparatus and the like in which an operation input can be performed by pressing an operation screen of an operating section.

The present application contains subject matter related to that disclosed in Japanese Priority Patent Application JP 2009-055405 filed in the Japan Patent Office on Mar. 9, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a recognition section which recognizes the shape of an object being in contact with an operation screen of an operating section on the basis of detected physical characteristics of the object;
   a pressure detecting section which detects the pressure of the object on the operation screen;
   a threshold value setting section which sets a threshold value of the pressure, which is a value for determining a pressure operation on the operation screen, on the basis of the shape of the object recognized by the recognition section; and
   a determination section which determines whether or not a pressure operation has been performed on the operation screen on the basis of the pressure detected by the pressure detecting section and the threshold value set by the threshold value setting section,
   wherein the recognition section recognizes the shape of the object on the basis of determinations, based on the detected physical characteristics of the object, of a thickness of the object, of whether the object is a fingertip, and of whether the object is a human thumb.

2. The information processing apparatus according to claim 1,
   wherein when the shape of the object recognized by the recognition section this time is different from the shape of the object recognized by the recognition section last time, the threshold value setting section resets the threshold value on the basis of the shape of the object recognized by the recognition section this time.

3. The information processing apparatus according to claim 2, further comprising:
   a threshold value adjusting section which adjusts the threshold value according to the pressure of the object detected by the pressure detecting section after the threshold value is set by the threshold value setting section.

4. The information processing apparatus according to claim 3,
   wherein the threshold value adjusting section calculates a change rate of the pressure detected by the pressure detecting section when the pressure of the object detected by the pressure detecting section is smaller than the threshold value, and adjusts the threshold value according to the pressure at a point of time when the change rate has changed from plus to minus.

5. The information processing apparatus according to claim 4,
   wherein the threshold value adjusting section adjusts the threshold value when an overshoot characteristic is acquired from a change in the pressure detected by the pressure detecting section.

6. The information processing apparatus according to claim 1, further comprising:
   a storage section which stores a threshold value, which is selected on the basis of the pressure of the object that can be estimated from the shape of the object, for various shapes of the object,
   wherein the threshold value setting section selects a threshold value, which corresponds to the shape of the object recognized by the recognition section, from a plurality of threshold values stored in the storage section and sets the selected threshold value as a threshold value of the pressure.

7. The information processing apparatus according to claim 1,
   wherein the recognition section recognizes the shape and the size of an object being in contact with the operation screen, and
   the threshold value setting section detects the thickness of the object from the shape and size of the object recognized by the recognition section and sets the threshold value on the basis of the thickness.

8. The information processing apparatus according to claim 1,
   wherein the thickness of the object is a length of a short side of the object.

9. The information processing apparatus according to claim 1,
   wherein the threshold value setting section further sets the threshold value of the pressure on the basis of a shape of a contacting portion of the object in contact with the operation screen and a shape of an approach portion of the object that is in proximity to but not in contact with operation screen.

10. The information processing apparatus according to claim 1, further comprising:
    a control section configured to change a scroll speed of an image being displayed on a display screen associated with the operation screen,
    wherein the control section changes the scroll speed of the image on the basis of the determination made by the determination section of whether or not the pressure operation has been performed.

11. The information processing apparatus according to claim 1, further comprising:
    a control section configured to change a scroll speed of an image being displayed on a display screen associated with the operation screen,
    wherein the threshold value setting section sets a plurality of threshold values of the pressure,
    wherein the determination section determines whether or not any one of a plurality of pressure operations has been performed on the operation screen on the basis of the pressure detected by the pressure detecting section and the plurality of threshold values set by the threshold value setting section, and
    wherein the control section changes the scroll speed of the image on the basis of the determination made by the determination section of whether or not any one of the plurality of pressure operations has been performed.

12. The information processing apparatus according to claim 1, further comprising:
    a control section configured to change a speed of changing a size of an image being displayed on a display screen associated with the operation screen,
    wherein the control section changes the speed of changing the size of the image on the basis of the determination made by the determination section of whether or not the pressure operation has been performed.

13. The information processing apparatus according to claim 1, further comprising:
    a control section configured to change a speed of changing a size of an image being displayed on a display screen associated with the operation screen,
    wherein the threshold value setting section sets a plurality of threshold values of the pressure,
    wherein the determination section determines whether or not any one of a plurality of pressure operations has been performed on the operation screen on the basis of the pressure detected by the pressure detecting section and the plurality of threshold values set by the threshold value setting section, and
    wherein the control section changes the speed of changing the size of the image on the basis of the determination made by the determination section of whether or not any one of the plurality of pressure operations has been performed.

14. A threshold value setting method comprising the steps of:
    recognizing, on the basis of detected physical characteristics of an object, the shape of the object being in contact with an operation screen of an operating section by means of a recognition section;
    setting a threshold value of the pressure of the object on the operation screen, which is a value for determining a pressure operation on the operation screen, on the basis of the shape of the object recognized by the recognition section by means of a threshold value setting section; and
    determining whether or not a pressure operation has been performed on the operation screen on the basis of the pressure of the object on the operation screen, which has been detected by the pressure detecting section, and the threshold value, which has been set by the threshold value setting section, by means of a determination section,
    wherein the shape of the object is recognized on the basis of determinations, based on the detected physical characteristics of the object, of a thickness of the object, of whether the object is a fingertip, and of whether the object is a human thumb.

15. A non-transitory computer-readable medium having embodied thereon a threshold value setting program, which when executed by a computer causes the computer to perform a method, the method comprising:
    recognizing, on the basis of detected physical characteristics of an object, the shape of the object being in contact with an operation screen;
    setting a threshold value of the pressure of the object on the operation screen, which is a value for determining a pressure operation on the operation screen, on the basis of the recognized shape of the object; and
    determining whether or not a pressure operation has been performed on the operation screen on the basis of the pressure of the object on the detected operation screen and the set threshold value,
    wherein the shape of the object is recognized on the basis of determinations, based on the detected physical characteristics of the object, of a thickness of the object, of whether the object is a fingertip, and of whether the object is a human thumb.

* * * * *